United States Patent
Kudo (10) Patent No.: US 8,874,903 B2
(45) Date of Patent: Oct. 28, 2014

(54) NETWORK DEVICE AND COMPUTER READABLE MEDIUM THEREFOR

(75) Inventor: Yasuhiro Kudo, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1186 days.

(21) Appl. No.: 12/609,067

(22) Filed: Oct. 30, 2009

(65) Prior Publication Data

US 2010/0115268 A1 May 6, 2010

(30) Foreign Application Priority Data

Oct. 31, 2008 (JP) ................................. 2008-282059

(51) Int. Cl.
  *H04L 29/06* (2006.01)
  *H04L 9/32* (2006.01)

(52) U.S. Cl.
  CPC .......... *H04L 9/3263* (2013.01); *H04L 63/0815* (2013.01); *H04L 63/0823* (2013.01); *H04L 9/3271* (2013.01)
  USPC ...................... 713/156; 726/4; 726/6; 726/10

(58) Field of Classification Search
  USPC .................................. 713/155, 156; 726/4–10
  See application file for complete search history.

(56) References Cited

U.S. PATENT DOCUMENTS

| | | | |
|---|---|---|---|
| 5,437,029 A | | 7/1995 | Sinha |
| 6,105,072 A | * | 8/2000 | Fischer ......................... 719/315 |
| 6,636,975 B1 | * | 10/2003 | Khidekel et al. ................ 726/10 |
| 7,120,929 B2 | * | 10/2006 | Beattie et al. ..................... 726/6 |
| 7,533,257 B2 | * | 5/2009 | Lee et al. ....................... 713/155 |
| 7,802,295 B2 | * | 9/2010 | Murase et al. .................. 726/10 |

(Continued)

FOREIGN PATENT DOCUMENTS

| | | |
|---|---|---|
| EP | 1223721 | 7/2002 |
| JP | 06-290096 | 10/1994 |

(Continued)

OTHER PUBLICATIONS

Notification of Reasons for Rejection in corresponding Japanese Application No. 2008-282059 dated Aug. 24, 2010.

(Continued)

*Primary Examiner* — Linglan Edwards
(74) *Attorney, Agent, or Firm* — Banner & Witcoff, Ltd.

(57) ABSTRACT

A network device, connectable with a service providing server and an authentication sever via a network, includes an acquisition information storage storing acquisition information for acquiring a certificate corresponding to each of services the service providing server provides, a certificate storage storing certificates acquired from the authentication server, a determining unit that, in response to acceptance of a request for utilizing a service, determines whether a certificate necessary for utilizing the requested service is stored in the certificate storage, and a controller that, when the necessary certificate is not stored, reads out acquisition information for the necessary certificate from the acquisition information storage, makes a certificate acquiring unit acquire the necessary certificate from the authentication server using the acquisition information, and stores the necessary certificate into the certificate storage. When the necessary certificate is stored, the controller makes the certificate acquiring unit acquire the necessary certificate from the certificate storage.

17 Claims, 8 Drawing Sheets

(56) References Cited

U.S. PATENT DOCUMENTS

| | | | |
|---|---|---|---|
| 7,962,744 B2* | 6/2011 | Yamamoto et al. | 713/155 |
| 7,991,996 B2* | 8/2011 | Benantar et al. | 713/156 |
| 2002/0026577 A1* | 2/2002 | Futamura et al. | 713/156 |
| 2002/0073213 A1 | 6/2002 | Mekata et al. | |
| 2003/0135732 A1* | 7/2003 | Vaha-Sipila | 713/156 |
| 2003/0195895 A1* | 10/2003 | Nowicki et al. | 707/100 |
| 2007/0005956 A1* | 1/2007 | Zilinskas et al. | 713/156 |
| 2007/0143596 A1* | 6/2007 | Myers et al. | 713/156 |

FOREIGN PATENT DOCUMENTS

| | | |
|---|---|---|
| JP | 2002-189702 | 7/2002 |
| JP | 2002-202955 | 7/2002 |
| JP | 2003-296277 | 10/2003 |
| JP | 2004-147090 | 5/2004 |
| JP | 2005-309897 | 11/2005 |

OTHER PUBLICATIONS

Learning with Verification—Windows: Fundamentals of Network "Kenshou-de Manabu—Windows: Network-no Kiso" written by Hakuji Arimoto, Nikkei Windows for IT Professionals No. 98, Nikkei Business Publications, Inc., Japan, May 1, 2005, p. 118-125.

Realization of Security with the Latest Cryptographic Technology "Saishin-no Angou-gijutsu-ni-yoru Security-no Jitsugen" written by Yuu Inamura, Open Design vol. 3 No. 3, CQ Publishing Co., Ltd., Japan, Jun. 1, 1996, vol. 3, p. 40-61.

Let's Use Free Management Tools Properly As Usage! "Youto-ni Oujite Mashou-no Kanri-tool-wo Tsukai-wake-you!" written by Masakazu Sato, Windows Server 2003 Support Desk, Windows Server World vol. 11 No. 3, IDG Japan, Inc., Japan, Mar. 1, 2006, vol. 11, p. 164-167.

* cited by examiner

| SERVICE S1 | USER NAME | PASSWORD | AUTHENTICATION SERVER NAME |
| SERVICE S2 | USER NAME | PASSWORD | AUTHENTICATION SERVER NAME |
| SERVICE S3 | USER NAME | PASSWORD | AUTHENTICATION SERVER NAME |
| ⋮ | ⋮ | ⋮ | ⋮ |
| SERVICE Sm | USER NAME | PASSWORD | AUTHENTICATION SERVER NAME |

NETWORK DEVICE AND COMPUTER READABLE MEDIUM THEREFOR

CROSS-REFERENCE TO RELATED APPLICATION

This application claims priority under 35 U.S.C. §119 from Japanese Patent Application No. 2008-282059 filed on Oct. 31, 2008. The entire subject matter of the application is incorporated herein by reference.

BACKGROUND

1. Technical Field

The following description relates to one or more network devices that begin to utilize a service provided by a service providing server by sending to the service providing server a certificate acquired from an authentication server on a network.

2. Related Art

So far a service providing server has been known, which provides various services in response to requests from network devices (e.g., information processing terminal devices such as personal computers). The service providing server performs an authentication process to determine whether a user of the network device is authorized to utilize a service requested, and provides the service after determining that the user is authorized.

For example, according to a known technique, an authentication server, which issues a certificate attesting that the user is authorized, is installed on a network, and the user is permitted to utilize an intended service provided by the service providing server using the certificate issued by the authentication server.

The above technique is adapted to attain a so-called single sign-on, and the Kerberos authentication is a typical example of an authentication method for the technique. In the Kerberos authentication, as exemplified in FIG. 9, when the user inputs information such as a user name and a password into a user terminal device (i.e., a network device) and logs in the user terminal device, the user terminal device transmits the information to the authentication server. Then, the user terminal device acquires from the authentication server a certificate that is referred to as a credential, and keeps holding the certificate (the credential) until the user terminates the use of the user terminal device (i.e., until a log-off operation is performed).

Further, when the user inputs a request for usage of the service providing server (an application server in FIG. 9) through the user terminal device in the log-in state, the user terminal device transmits to the application server the service usage request along with the certificate (the credential).

Then, the service providing server (the application server) determines, using the authentication server, whether the certificate (the credential) transmitted along with the service usage request is proper. When the certificate (the credential) is determined to be proper, the service providing server permits the user terminal device to utilize the requested service.

SUMMARY

The aforementioned authentication technique, which is adapted to the single sign-on, can improve user-friendliness in the case where the network device is an information processing device configured such that the user inputs personal data to log in the device. However, when the network device is an information processing device configured such that a lot of users can freely use it without having to performing any log-in/log-off operations (specifically, when the network device is an information device such as a Multi-Function Peripheral (MFP) provided with a printer function, a scanner function, etc.), the authentication technique cannot provide the aforementioned effect.

More specifically, in a network device such as an MFP which a lot of users can freely use, in order to connect to the service providing server on the network to which the aforementioned authentication technique is applied, each user has to input the personal data into the network device and cause the network device to acquire the certificate from the authentication server every time the user attempts to utilize a service provided by the service providing server. Thus, it is unfortunate that such a network device is inconvenient for the user.

Aspects of the present invention are advantageous to provide one or more improved techniques that allow a network device to easily utilize a service provided by a service providing server when the network device is connected, in a manner usable by a lot of users, with a network on which there are installed a service providing server and an authentication server that issues a certificate necessary for the service providing server to authenticate the users.

According to aspects of the present invention, a network device, connectable with a service providing server and an authentication sever via a network, is provided. The network device includes a request accepting unit configured to accept a request for usage of a service provided by the service providing server, a certificate acquiring unit configured to acquire a certificate necessary for utilizing the service requested by the request accepted, from one of the authentication server and the network device, a certificate sending unit configured to send the necessary certificate acquired, to the service providing server, a permission receiving unit configured to receive a permission to utilize the requested service from the service providing server, a service utilizing unit configured to utilize the requested service in response to receipt of the permission, an acquisition information storage configured to store therein acquisition information for acquiring a certificate corresponding to each of services which the service providing server provides, a certificate storage configured to store therein certificates acquired from the authentication server, a determining unit configured to, in response to acceptance of the request, determine whether the certificate necessary for utilizing the requested service is stored in the certificate storage, and a controller configured to, when the determining unit determines that the necessary certificate is not stored in the certificate storage, read out acquisition information for acquiring the necessary certificate from the acquisition information storage, cause the certificate acquiring unit to acquire the necessary certificate from the authentication server based on the acquisition information read out, and store the necessary certificate acquired into the certificate storage. The controller is configured to, when the determining unit determines that the necessary certificate is stored in the certificate storage, cause the certificate acquiring unit to acquire the necessary certificate from the certificate storage.

According to aspects of the present invention, further provided is a computer readable medium having computer readable instructions stored thereon. When executed by a processor of a network device connectable with a service providing server and an authentication sever via a network, the instructions cause the processor to perform a request accepting step of accepting a request for usage of a service provided by the service providing server, a certificate acquiring step of acquiring a certificate necessary for utilizing the service requested by the request accepted, from one of the authentication server and the network device, a certificate sending step of sending the necessary certificate acquired, to the service providing server, a permission receiving step of receiving a permission to utilize the requested service from the service providing server, and a service utilizing step of utilizing the requested service in response to receipt of the permission. The certificate acquiring step includes a determining step of, in response to acceptance of the request, determining whether the certificate necessary for utilizing the requested service is stored in a certificate storage of the network device that stores therein certificates acquired from the authentication server. The certificate acquiring step is configured to, when it is determined in the determining step that the certificate necessary for utilizing the requested service is not stored in the certificate storage, read out acquisition information for acquiring the necessary certificate from an acquisition information storage of the network device that stores therein acquisition information for acquiring a certificate corresponding to each of services which the service providing server provides, acquire the necessary certificate from the authentication server based on the acquisition information read out, and store the necessary certificate acquired into the certificate storage. The certificate acquiring step is further configured to, when it is determined in the determining step that the certificate necessary for utilizing the requested service is stored in the certificate storage, acquire the necessary certificate from the certificate storage.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompany drawings.

[Overall Configuration of Network System]

Figure 1A:
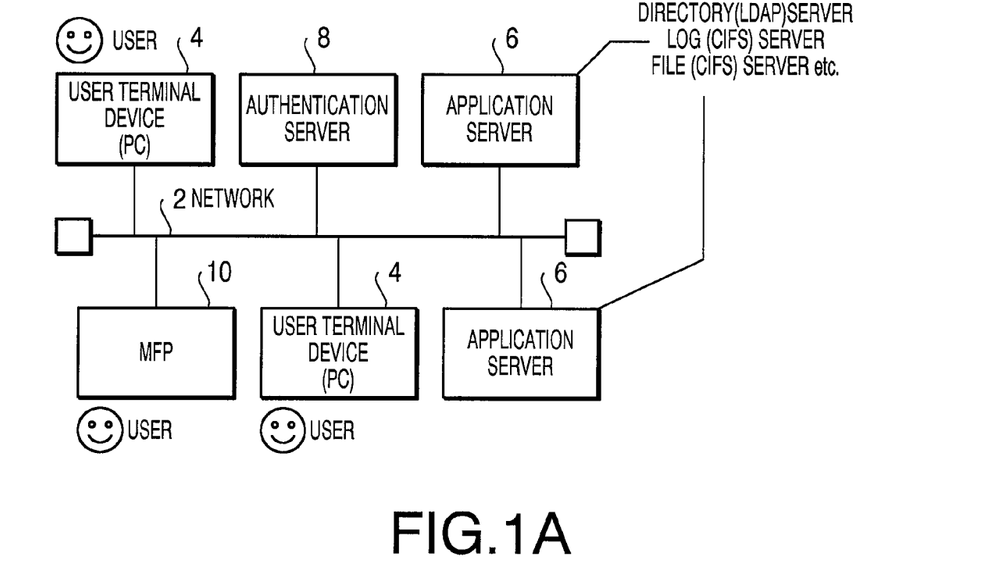
FIG. 1A is a block diagram schematically showing a configuration of a network system in an embodiment according to one or more aspects of the present invention.

As illustrated in FIG. 1A, a network system in an embodiment according to aspects of the present invention includes a plurality of user terminal devices 4, a Multi-Function Peripheral (MFP) 10, a plurality of application servers 6, and an authentication server 8. The user terminal devices 4 and the MFP 10 are connected with a network 2 (e.g., the Internet, a corporate LAN, etc.) on which communication is performed using the IP protocol, and operated by users. The application servers 6 provide various services in response to requests from the user terminal devices 4 and the MFP 10. The authentication server 8 issues a certificate that is required for authenticating a user of a service.

Figure 9:
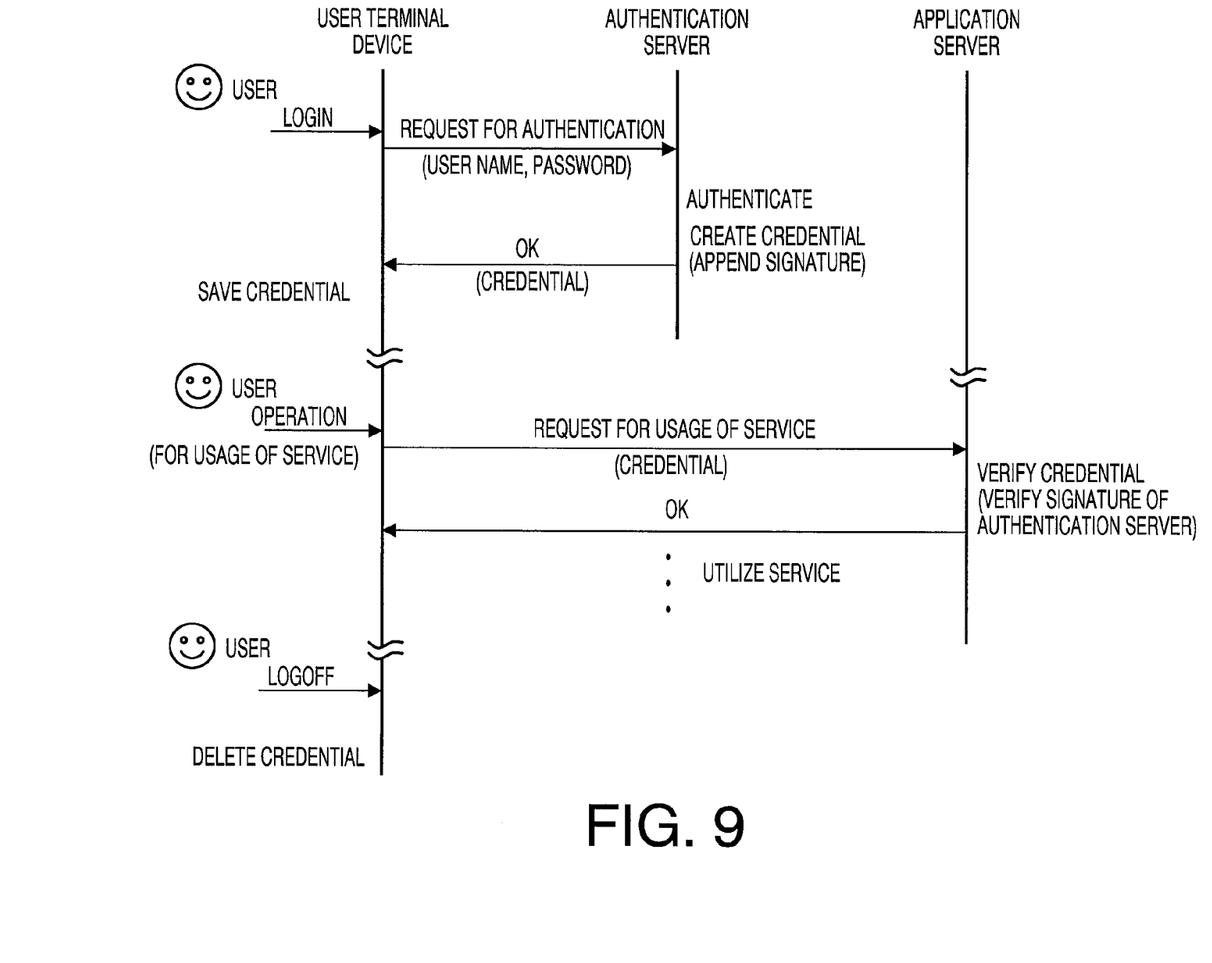
FIG. 9 illustrates communication operations performed when a user terminal device utilizes a service in a known authentication method.

The authentication server 8 is a known server configured to perform the Kerberos authentication. Specifically, as illustrated in FIG. 9, when receiving a request for authentication from a network device (e.g., a user terminal device 4, the MFP 10, etc.), the authentication server 8 determines, based on a user name and/or a password included in the authentication request, whether the authentication request is from an authorized user who has previously been registered. When the authentication request is from an authorized user, the authentication server 8 issues a certificate, which is referred to as a credential, to the network device that has transmitted the authentication request.

Each of the application servers 6 executes application software to provide various services to a client (e.g., a user terminal device 4, the MFP 10, etc.) which has accessed the application server 6.

Then, as shown in FIG. 9, in response to a request for usage of a service from a client, the application server 6 determines whether a credential included in the service usage request is a proper one issued by the authentication server 8. When the credential is determined to be proper, the application server 6 executes predetermined application software corresponding to the service usage request and provides a predetermined service to the client (the network device).

It is noted that each of the application servers 6 serves as at least one of a directory server that manages information on users and devices on the network 2 using the Lightweight Directory Access Protocol (LDAP) and provides the information to a client (e.g., a user terminal device 4, the MFP 10, etc.), a log server that manages a communication log of the client using the Common Internet file System (CIFS), and a file server that saves data transmitted by the client using the CIFS.

In the embodiment, the functions of the directory server, the log server, and the file server are achieved by the plurality of application servers 6. Therefore, when connected with any one of the application servers 6, each of the user terminal devices 4 and the MFP 10 can utilize various services such as a directory service, a log service, and a file service that are provided by the application servers 6.

Each user terminal device 4 is an information processing device such as a personal computer (PC). When a user logs in a user terminal device 4, the user terminal device 4 acquires the credential from the authentication server 8 in accordance with a procedure shown in FIG. 9. Thereafter, until the user logs off the user terminal device 4, in response to a service usage command from the user, the user terminal device 4 transmits a service usage request with the credential attached thereto to an application server 6, and utilizes a predetermined service provided by the application server 6.

[Configuration of Multi-Function Peripheral]

Figure 1B:
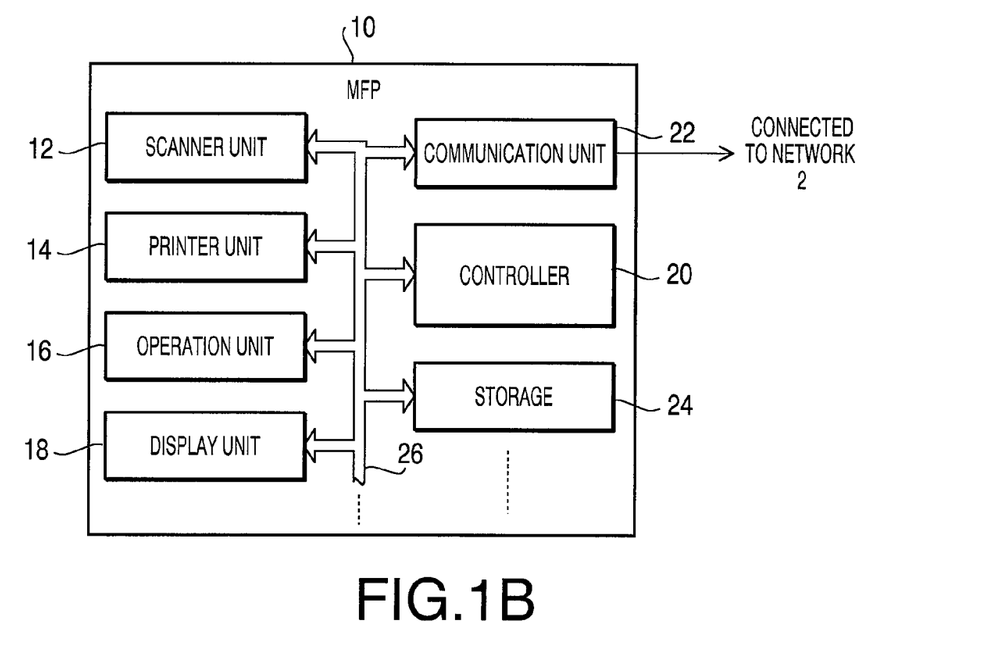
FIG. 1B is a block diagram schematically showing a configuration of a Multi-Function Peripheral (MFP) included in the network system in the embodiment according to one or more aspects of the present invention.

The MFP 10 has various functions such as a printer function, a scanner function, and a copy function. As illustrated in FIG. 1B, the MFP 10 includes a scanner unit 12, a printer unit 14, an operation unit 16, a display unit 18, a controller 20, a communication unit 22, a storage 24, and a bus 26 which links the aforementioned elements.

The scanner unit 12 and the printer unit 14 are configured to operate in accordance with commands from the controller 20. Specifically, the scanner unit 12 serves as a scanner configured to scan an image recorded (printed) on a document and create image data that represents the image scanned. In addition, the printer unit 14 serves as a printer configured to form (print), on a recording medium such as a sheet, an image based on print data that is temporarily stored on the storage 24.

The operation unit 16 is provided with a plurality of keys which the user can operate. The operation unit 16 acquires information on user's operations through the keys and inputs the acquired information (i.e., various operation commands) into the controller 20. Further, in response to a command from the controller 20, the display unit 18 displays an operational status of the MFP 10 and various messages for the user. Additionally, the communication unit 22, which is connected with the network 2, performs data communication with devices (e.g., the user terminal devices 4, the authentication server 8, and the application server 6) on the network 2.

The controller 20 is configured with a microcomputer that includes a CPU, a ROM, and a RAM. The controller 20 controls the aforementioned elements in accordance with programs stored on the ROM, and makes the MFP 10 to serve as a printer, a scanner, and a copy machine.

More specifically, by taking drive control of the scanner unit 12 and the printer unit 14 in response to commands directly input through the operation unit 16 or commands received from a user terminal device 4 via the network 2 and the communication unit 22, the controller 20 causes the MFP 10 to serve as a printer, a scanner and a copy machine.

In addition, when performing data communication with another network device (e.g., a user terminal device 4) via the communication unit 22, the controller 20 connects to the application server 6 that serves as a directory server and acquires information on the network device. Further, when performing data communication with another network device, the controller 20 connects to the application server 6 that serves as a log server and registers a communication log in the application server 6.

Furthermore, in response to commands from the operation unit 16 or a user terminal device 4, the MFP 10 stores image data scanned with the scanner unit 12 on the file server via the communication unit 22, and acquires image data from the file server and causes the printer unit 14 to form (print) an image based on the image data acquired. When exchanging such image data with the file server, the controller 20 connects to the application server 6 that serves as a file server and sends or receives the image data.

Thus, in the same manner as the user terminal devices 4, the MFP 10 can utilize various services such as the directory service, the log service, and the file service that are provided by the application servers 6.

In order to utilize the services, the credential has to be acquired from the authentication server 8. Further, in order to acquire the credential from the authentication server 8, a request for authentication that includes a user name and a password has to be transmitted to the authentication server 8.

Figure 2A:
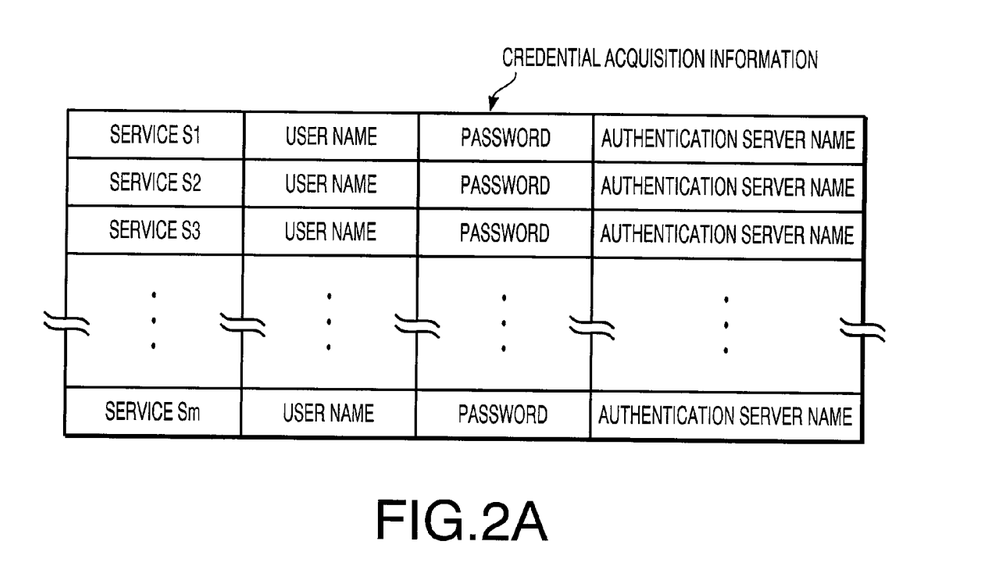
FIG. 2A shows a configuration of credential acquisition information in the embodiment according to one or more aspects of the present invention.

In the embodiment, credential acquisition information as shown in FIG. 2A is stored on the storage 24 of the MFP 10. When using a service provided by an application server 6 in accordance with a user command, the controller 20 reads out, from the storage 24, credential acquisition information that corresponds to the service, and sends, to the authentication server 8, a request for authentication that corresponds to the credential acquisition information read out. Thereby, the controller 20 can acquire the credential required for utilizing the service.

It is noted that the credential acquisition information stored on the storage 24 has a user name, a password, an authentication server name registered for each of services S1 to Sm which are provided by the application servers 6. Here, the user name and the password are necessary for acquiring the credential from the authentication server 8. Further, the authentication server name is required for specifying the authentication server 8 in which the credential is registered.

The credential acquisition information is set for each of the services S1 to Sm that are provided by the application servers 6. The services S1 to Sm are sectioned with respect to not only the sorts of services such as the directory service, the log service, and the file service but also usage conditions of services such as a folder location where image data is stored in the file service.

The storage 24 stores the credential acquisition information for each of the services S1 to Sm which are sectioned into "m" pieces. The services S1 to Sm sectioned into "m" pieces may include a plurality of services S for which a common credential is used in a common application server 6. In such a case, identical credential acquisition information is set for the plurality of services S.

Figure 2B:
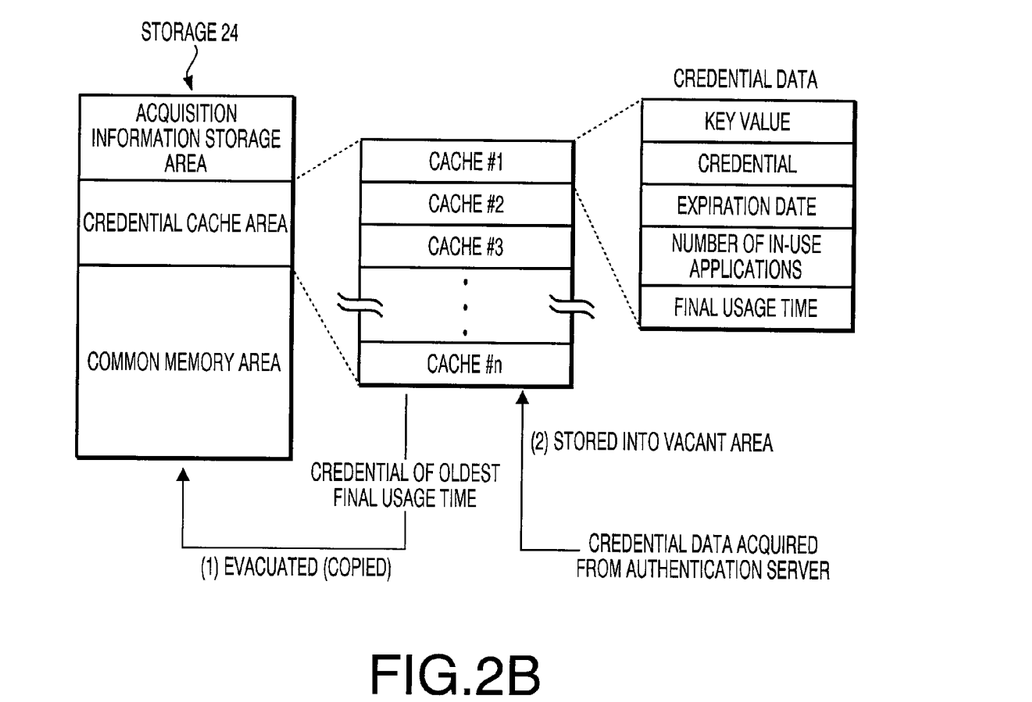
FIG. 2B shows a storage area structure of a storage of the MFP and a data structure of credential data stored on the storage in the embodiment according to one or more aspects of the present invention.

The storage 24 is configured with a non-volatile rewritable memory. As illustrated in FIG. 2B, the storage 24 is divided into three areas, i.e., an acquisition information storage area on which the above credential acquisition information is previously stored, a credential cache area on which the credential acquired from the authentication server 8 is saved, and a common memory area on which various kinds of data such as image data scanned by the scanner unit 12 and print data to be output to the printer unit 14 is temporarily stored.

Further, the credential cache area is divided into "n" cache areas #1 to #n so as to store the credentials acquired from the authentication server 8. Here, the number "n" is set as an upper limit less than the possible maximum number "m" of the pieces of credential acquisition information stored in the acquisition information storage area.

Each of the cache areas #1 to #n stores credential data that includes, as well as the credential acquired from the authentication server 8, a key value that is created based on the credential acquisition information (the user name, the password, and the authentication server name) when the credential acquisition information is acquired, an expiration date of the credential, the number of in-use applications that represents the number of services actually utilized with the credential being transmitted to the application server 6, and a final usage time of the credential.

[Operations of MFP]

The controller 20 of the MFP 10 determines whether a service usage request is externally input, by determining whether a control command for utilizing a service provided by an application server 6 is input.

Figure 3:
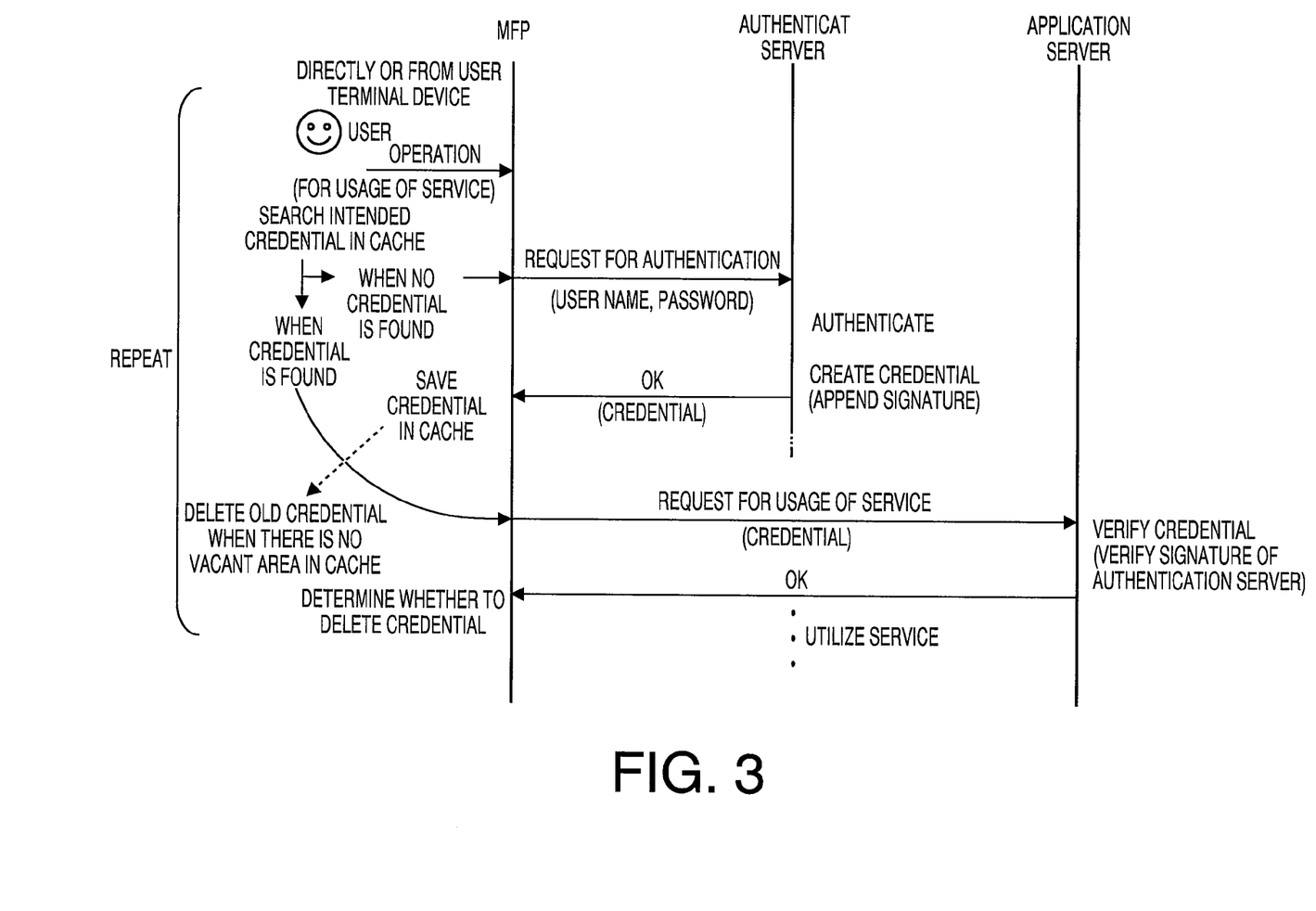
FIG. 3 illustrates communication operations performed when the MFP utilizes a service in the embodiment according to one or more aspects of the present invention.

When determining that a service usage request is externally input, according to a procedure as shown in FIG. 3, the controller 20 transmits the service usage request to the application server 6, receives a permission to use the service from the application server 6, and begins to use the service.

Specifically, as illustrated in FIG. 3, when determining that a service usage request is externally input, the controller 20 determines whether the credential necessary for using the service is stored in the credential cache area of the storage 24.

When the credential necessary for using the service is not stored in the credential cache area of the storage 24, the controller 20 reads out the acquisition information for the credential from the acquisition information storage area of the storage 24, and transmits an authentication request to the authentication server 8 based on the acquisition information read out. Then, the controller 20 acquires the credential from the authentication server 8, and stores the credential in the credential cache area of the storage 24.

When the controller 20 attempts to store the credential acquired from the authentication server 8 in the credential cache area but determines that a capacity enough to store the credential is not left in the credential cache area, the controller 20 deletes an old credential from the credential cache area.

Meanwhile, when the credential is acquired in this manner, or when the controller 20 determines that the credential necessary for utilizing the service is stored in the credential cache area, the controller 20 transmits to the application server 6 the credential along with the service usage request, thereby receives the permission to utilize the service, and begins to utilize the service.

After storing the credential in the credential cache area of the storage 24, the controller 20 determines whether the usage of all the services which require the credential is terminated. When determining that the usage of all the services which require the credential is terminated, the controller 20 removes the credential from the credential cache area of the storage 24.

Hereinafter, detailed explanation will be given with reference to FIGS. 4 to 6 to set forth a control process to be executed by the controller 20 of the MFP 10 to utilize an application servers 6.

Figure 4:
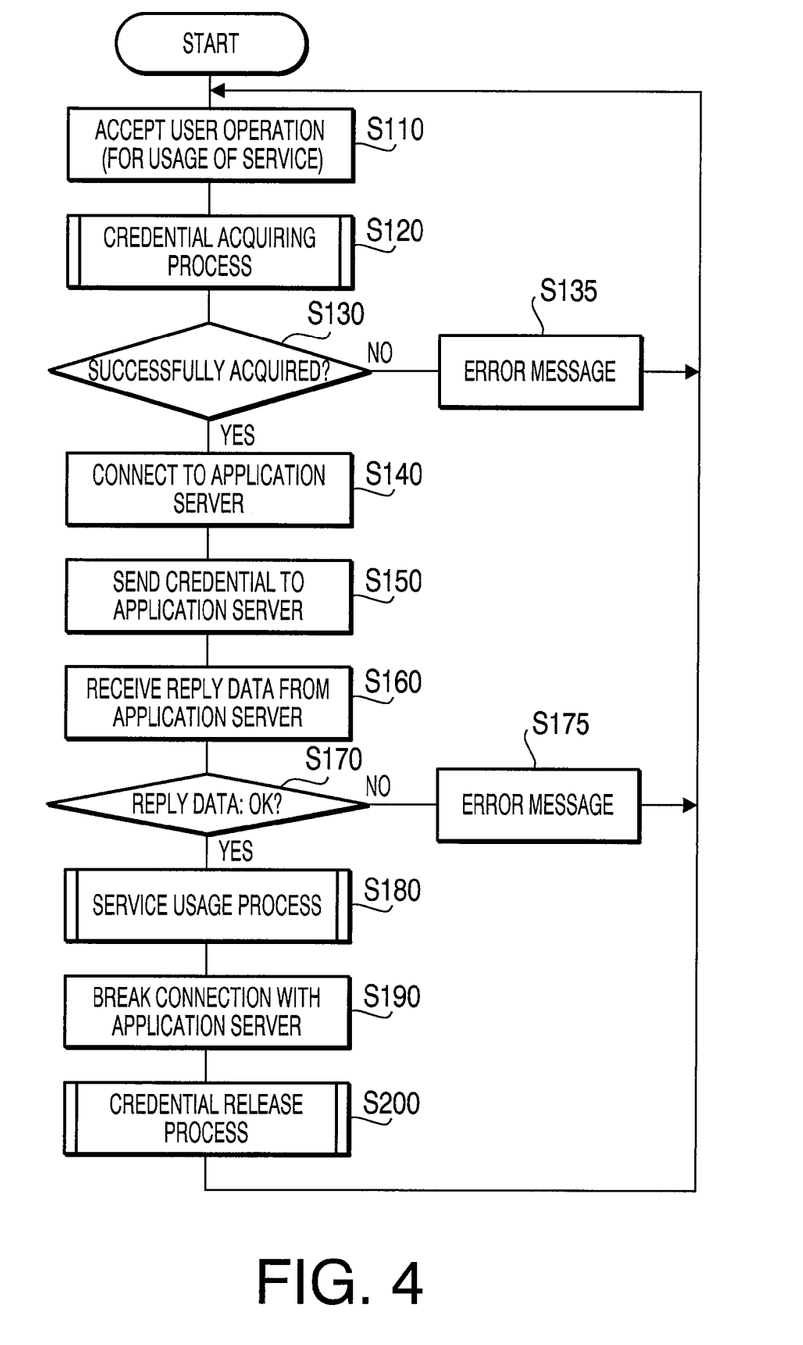
FIG. 4 is a flowchart showing a control process to be executed by a controller of the MFP to utilize the service in the embodiment according to one or more aspects of the present invention.

A control process shown in FIG. 4 is repeatedly performed by the controller 20 to utilize an application server 6 after the MFP 10 is powered ON. As illustrated in FIG. 4, after starting the control process, the controller 20 first receives a user operation (specifically, a service usage request) through the operation unit 16 or a user terminal device 4 (S110).

Then, the controller 20 performs a credential acquiring process (see FIG. 5) to acquire a credential necessary for utilizing a service corresponding to the received command (S120). Thereafter, the controller 20 determines whether the credential is acquired in the credential acquiring process (S130).

Subsequently, when determining that the credential is acquired in S130, the controller 20 connects to the application server 6 that provides the service corresponding to the credential (S140). Then the controller 20 sends to the application server 6 the credential acquired in S120 (S150), and waits for reply data to be sent by the application server 6 (S160).

When the reply data is received from the application server 6 via the communication unit 22, the controller 20 determines whether the reply data gives permission to utilize the service (S170). When the reply data gives permission to utilize the service (S170: Yes), the controller 20 performs a service usage process to utilize the service (S180).

It is noted that the service usage process is adapted such that a memory location of the credential necessary for utilizing the service on the storage 24 is stored on the RAM when the service usage process is executed. By reading out the credential from the memory location and sending the credential to the application server 6, the controller 20 continues to utilize the service.

After executing the service usage process (S180), the controller 20 breaks the connection with the application server 6 that has been established for use of the service (S190). Thereafter, the controller 20 performs a credential release process (S200), and thereafter goes back to S110.

Meanwhile, when determining that the credential is not acquired (S130: No), the controller 20 displays on the display unit 18 an error message representing that the credential is not acquired (S135), and thereafter goes back to S110. In addition, when determining that the reply data does not give permission to utilize the service (S170: No), the controller 20 displays on the display unit 18 an error message representing that the reply data does not give permission to utilize the service, and thereafter goes back to S110.

The step S110 is executed by the controller 20 in response to every operation command input by the user through the operation unit 16 or a user terminal device 4. The steps S110 to S200 are performed in parallel in response to every service usage request accepted in S110. Therefore, according to the MFP 10 in the embodiment, a plurality of users can concurrently utilize a plurality of services provided by the application servers 6. Further, every time the usage of each service is started or terminated, credential data is added in the credential cache area, or credential data in the credential cache area is deleted therefrom or updated.

Figure 5:
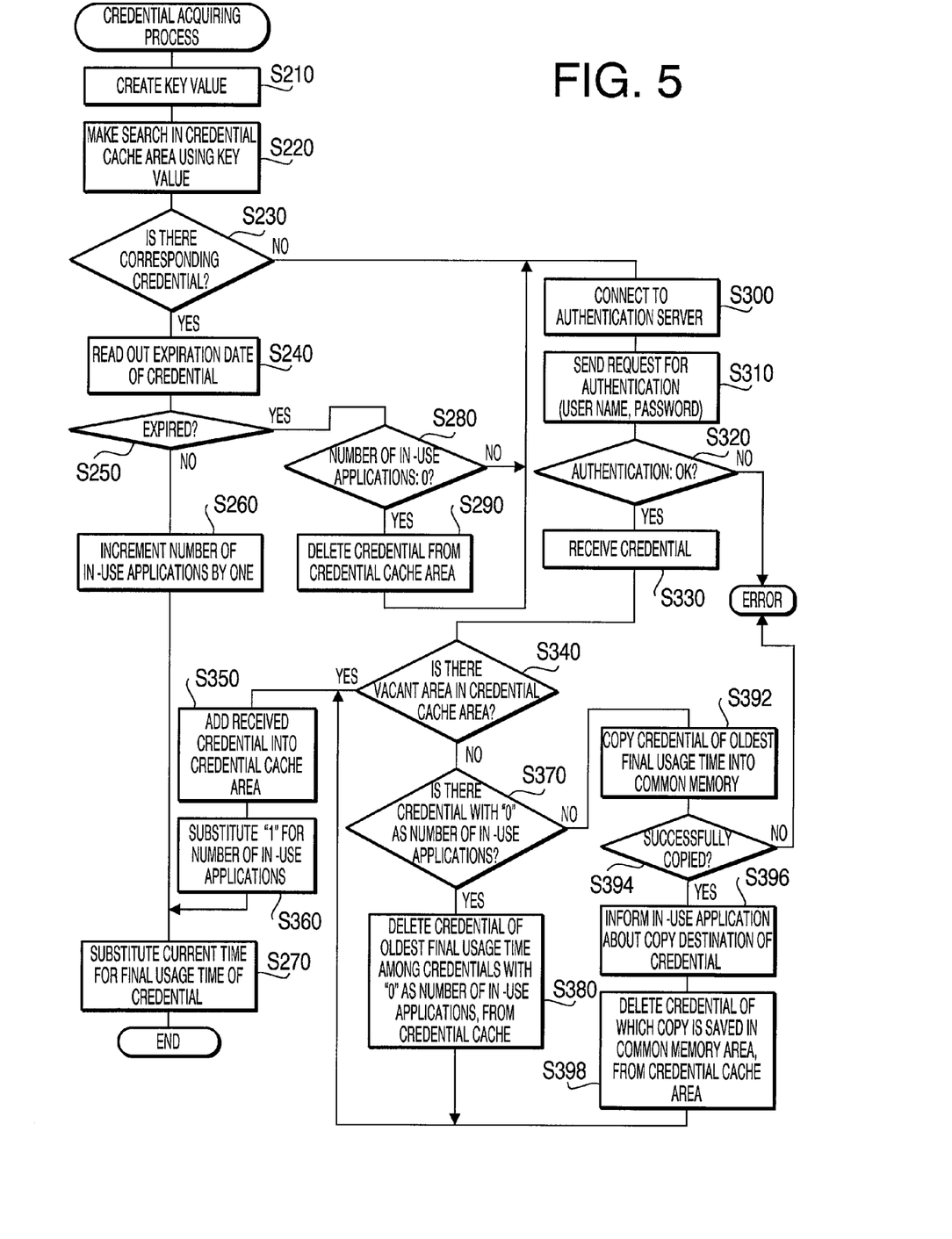
FIG. 5 is a flowchart showing a detailed procedure of a credential acquiring process in the control process in the embodiment according to one or more aspects of the present invention.

As illustrated in FIG. 5, in the credential acquiring process executed in S120, the controller 20 first executes a step S210. In S210, the controller 20 reads out, from the acquisition information storage area of the storage 24, a user name, a password, and an authentication server name that are credential acquisition information corresponding to the service for which the usage request has been received in S110. The controller 20 creates a key value that is uniquely determined based on the information read out. Incidentally, for instance, the hash function is used for the creation of the key value.

After the key value is created in S210, the controller 20 makes a search in the credential cache area of the storage 24 using the key value created (S220). Then, the controller 20 determines based on the search result whether there is a credential corresponding to the key value in the credential cache area (S230).

When determining that there is a credential corresponding to the key value in the credential cache area (S230: Yes), the controller 20 reads out an expiration date stored along with the credential in the credential cache area (S240). Thereby, the controller 20 determines whether the credential, which corresponds to the key value and is stored in the credential cache area, is expired (S250).

When determining that the credential corresponding to the key value is not expired (S250: No), the controller 20 increments the number of in-use applications by one (S260). Further, the controller 20 substitutes a current time for the final usage time to update the credential data, corresponding to the key value, which is stored in the credential cache area (S270). After that, the credential acquiring process is terminated.

Meanwhile, when it is determined in S230 that there is no credential corresponding to the key value in the credential cache area (S230: No), the controller 20 advances to S300. Further, when it is determined in S250 that the credential corresponding to the key value expires (S250: Yes), the controller 20 determines whether the number of in-use applications of the credential is "0" (S280). When the number of in-use applications is "0" (S280: Yes), the controller 20 deletes the credential data for the credential from the credential cache area (S290), and thereafter proceeds to S300. Meanwhile, when the number of in-use applications is not "0" (S280: No), the controller 20 goes to S300 without executing S290.

In S300, the controller 20 connects to the authentication server 8 that is identified with the credential acquisition information (specifically, the authentication server name) corresponding to the service for which the usage request is received in S110, via the communication unit 22. Then, the controller 20 sends, to the authentication server 8 to which the controller 20 connects, an authentication request that includes the user name and the password as constituents of the credential acquisition information (S310). After that, the controller 20 waits the credential to be created by the authentication server 8, determining whether a reply "Authentication: OK" is received from the authentication server 8 (S320).

When determining that a reply "Authentication: OK" is received from the authentication server 8 (S320: Yes), the controller 20 proceeds to S330, in which the controller 20 receives the credential transmitted by the authentication server 8. After that, the controller 20 advances to S340. Meanwhile, when determining that a reply "Authentication: OK" is not received from the authentication server 8 (S320: No), the controller 20 stores an error that the credential is not acquired, and terminates the credential acquiring process.

In S340, the controller 20 determines whether there is a vacant area enough to add therein credential data in the credential cache area of the storage 24. When there is a vacant area enough to add therein credential data in the credential cache area (S340: Yes), the controller 20 stores in the vacant area of the credential cache area the credential received in S330, the expiration date thereof, and the key value created in S210 (S350). Further, the controller 20 stores, in the vacant area of the credential cache area, "1" as the number of in-use applications (S360). Then, the controller 20 goes to the aforementioned step S270.

Consequently, in the vacant area of the credential cache area, credential data is additionally registered which includes the key value, the expiration date, the number of in-use applications, the final usage time, in addition to the latest credential acquired in S330.

In the meantime, when determining in S340 that there is not a vacant area enough to add therein credential data in the credential cache area of the storage 24 (S340: No), the controller 20 goes to S370, in which the controller 20 determines whether there is a credential with "0" as the number of in-use applications in the credential cache area of the storage 24.

When determining that there is a credential with "0" as the number of in-use applications in the credential cache area of the storage 24 (S370: Yes), the controller 20 goes to S380, in which the controller 20 deletes, from the credential cache area, credential data for a credential of the oldest final usage time among credentials with "0" as the number of in-use applications. Thereafter, the controller 20 goes to S350.

Consequently, in the credential cache area from which the credential data has been deleted in S380, in the following steps S350, S360, and S270, credential data is additionally registered with a key value, an expiration date, the number of in-use applications, and a final usage time of the latest credential attached to the latest credential acquired in S330.

Further, when determining in S370 that there is not a credential with "0" as the number of in-use applications in the credential cache area of the storage 24 (S370: No), the controller 20 goes to S392, in which the controller 20 copies, into the common memory area of the storage 24, a credential of the oldest final usage time among credentials stored in the credential cache area. Then, the controller 20 determines whether the copying has successfully been done (S394).

When determining that the copying has successfully been done (S394: Yes), the controller 20 advances to S396, in which the controller 20 provides the service usage process (i.e., the in-use application in the service usage process) utilizing the service which needs the copied credential, with information about a copy destination of the credential (i.e., a memory location of the credential in the common memory area). Thereafter, the controller 20 deletes, from the credential cache area, credential data for the credential of which the copy is saved in the common memory area (S398), and then goes to S350.

Consequently, in the credential cache area from which the credential data has been deleted in S398, in the following steps S350, S360, and S270, credential data is additionally registered with a key value, an expiration date, the number of in-use applications, and a final usage time of the latest credential attached to the latest credential acquired in S330.

Meanwhile, when determining that the copying has not successfully been done (S394: No), the controller 20 saves a storage error that the credential is not successfully stored, and terminates the credential acquiring process.

Figure 6:
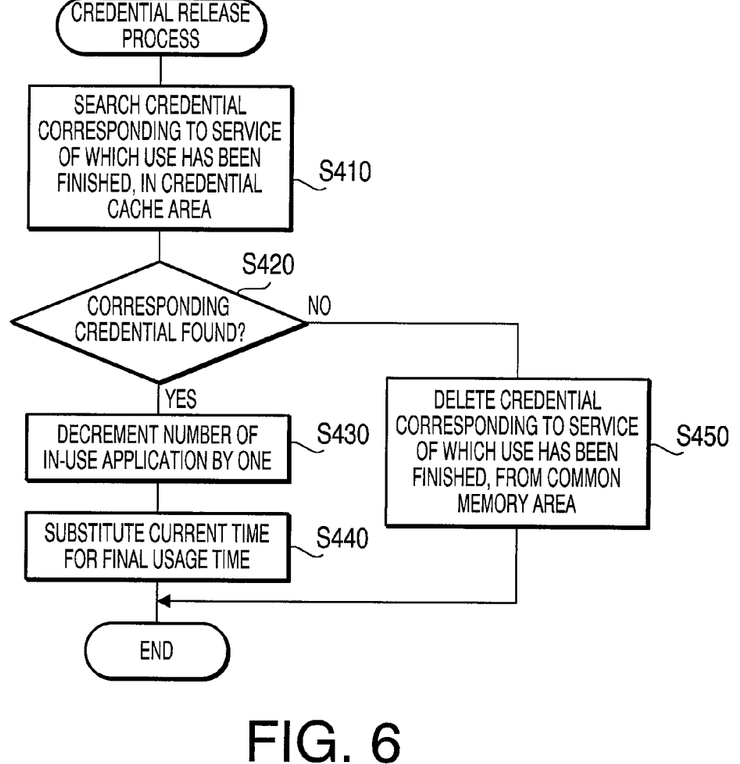
FIG. 6 is a flowchart showing a detailed procedure of a credential release process in the control process in the embodiment according to one or more aspects of the present invention.

As illustrated in FIG. 6, in the credential release process, the controller 20 first searches a credential corresponding to the service for which the connection with the application server 6 has been broken in S190 (i.e., the service of which the use has been finished) from the credential cache area of the storage 24 (S410). Then, the controller 20 determines whether the credential is stored in the credential cache area (S420).

When determining in S420 that the credential is stored in the credential cache area (S420: Yes), the controller 20 decrements by one the number of in-use applications for the credential that is included in the credential data stored in the credential cache area (S430). Further, the controller 20 substitutes a current time for the final usage time of the credential (S440). Thereafter, the credential release process is terminated.

Meanwhile, when determining in S420 that the credential, corresponding to the service of which the use has been finished, is not stored in the credential cache area (S420: No), since the copy of the credential corresponding to the service is saved in the common memory area, the controller 20 deletes the credential from the common memory area (S450). Thereafter, the credential release process is terminated.

[Effects of Embodiment]

As described above, the MFP 10 of the embodiment has a plurality of pieces of credential acquisition information stored in the acquisition information storage area of the storage 24 thereof. The credential acquisition information is previously set for each sort or each usage condition of services provided by the applications servers 6.

When the MFP 10 utilizes a predetermined service provided by an application server 6 in response to a user command, the MFP 10 determines whether a credential corresponding to the service has already been acquired from the authentication server 8 and stored in the credential cache area of the storage 24 (S210-S230).

When the credential corresponding to the service is stored in the credential cache area, the MFP 10 connects to the application server 6 using the credential stored, and utilizes the service specified by the user command (S140-S180).

Meanwhile, when the credential is not stored in the credential cache area, the MFP 10 acquires from the authentication server 8 the credential required for utilizing the service based on the credential acquisition information stored in the acquisition information storage area of the storage 24 (S300-S330). Then, the MFP 10 connects to the application server 6 using the credential acquired, and utilizes the service specified by the user command (S140-S180).

Thus, according to the MFP 10 of the embodiment, the user can utilize a desired service provided by an application server 6, only by specifying a function using the service (e.g., the scanner function or the printer function) or a usage condition for the service (e.g., a storage location for scanned image data or a storage location of print data).

Therefore, according to the embodiment, the user can use the MFP 10 in an easy and simple manner without having to input acquisition information (e.g., a user name or a password) required for acquiring the credential every time the user utilizes a service provided by an application server 6.

Further, the credential acquired from the authentication server 8 is stored in the credential cache area of the storage 24 (S350). After that, in utilizing the service corresponding to the credential stored in the credential cache area, the credential stored is used. Therefore, the credential does not have to be acquired from the authentication server 8 every time the user utilizes the service provided by the application server 6, and thus the service becomes available promptly.

Accordingly, when causing the MFP 10 to serve as a scanner or a printer that utilizes a service provided by an application server 6, the user can quickly achieve it. Thus, it is possible to improve the user-friendliness of the MFP 10.

Further, by storing the credential in the credential cache area, it is possible to decrease the frequency to access the authentication server 8. Thus it is possible to prevent the processing load of the MFP 10 from rising due to accesses to the authentication server 8. Furthermore, it is possible to reduce network traffic.

Further, the credential acquired from the authentication server 8 has the expiration date attached thereto as additional information. An expired credential is preferentially deleted from the credential cache area (S250-S290). Therefore, it is possible to prevent a credential from not being stored in the credential cache area of the storage 24 over a long time because the expired credential remains saved over a long time.

Furthermore, the credentials acquired from the authentication server 8 are stored in the credential cache area of the storage 24 within the upper limit "n" for the number of credentials (S340 and S350). Moreover, when there is no vacant area for saving another credential in the credential cache area, a credential of the oldest final usage time is selectively deleted from the credential cache area (S380 or S398).

Hence, it is possible to prevent a credential frequently used, e.g., for connection to a log server, from being deleted from the credential cache area. Thus, it is possible to keep accesses to the authentication server 8 from increasing due to the frequently-used credential being deleted.

Additionally, when a credential of the oldest final usage time, which is selected as a credential to be deleted, is being used for a different service, the credential is evacuated (copied) into the common memory area of the storage 24 (S392), and then deleted from the credential cache area (S398). Thereby, the credential can continuously be used for the different service (see FIG. 2B).

Hence, according to the embodiment, a service in use can continuously be utilized with the credential corresponding to the in-use service being kept, while the credential cache area of the storage 24 is restricted to a storage capacity required for saving "n" pieces of credential data.

Further, the credential stored in the common memory area is deleted from the common memory area after the service using the credential is terminated (S200). Therefore, the number of credentials stored in the common memory area can be restricted to a minimum necessary. Thus, since it is not required for saving credentials to enlarge the storage capacity of the common memory area, it is possible to reduce the cost of a non-volatile memory that constitutes the storage 24 while restricting the entire storage capacity of the storage 24.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

Figure 7:
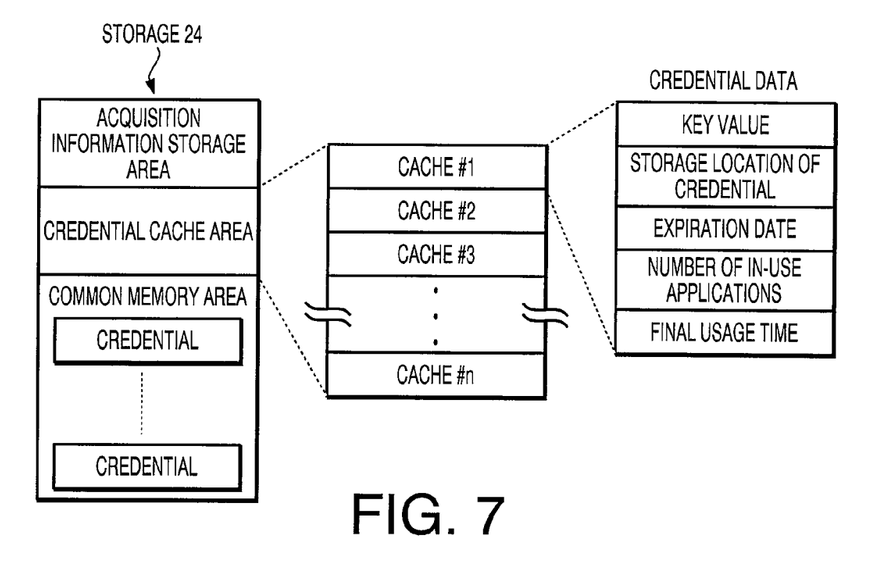
FIG. 7 shows a storage area structure of a storage of an MFP and a data structure of credential data stored on the storage in a modification according to one or more aspects of the present invention.

In the aforementioned embodiment, the credential cache area of the storage 24 is adapted to store therein the credential acquired from the authentication server 8 as is. However, as illustrated in FIG. 7, the credential acquired from the authentication server 8 may be stored in the common memory area of the storage 24, and the credential cache area may store therein a storage location (a memory address) of the credential in the common memory area.

Figure 8:
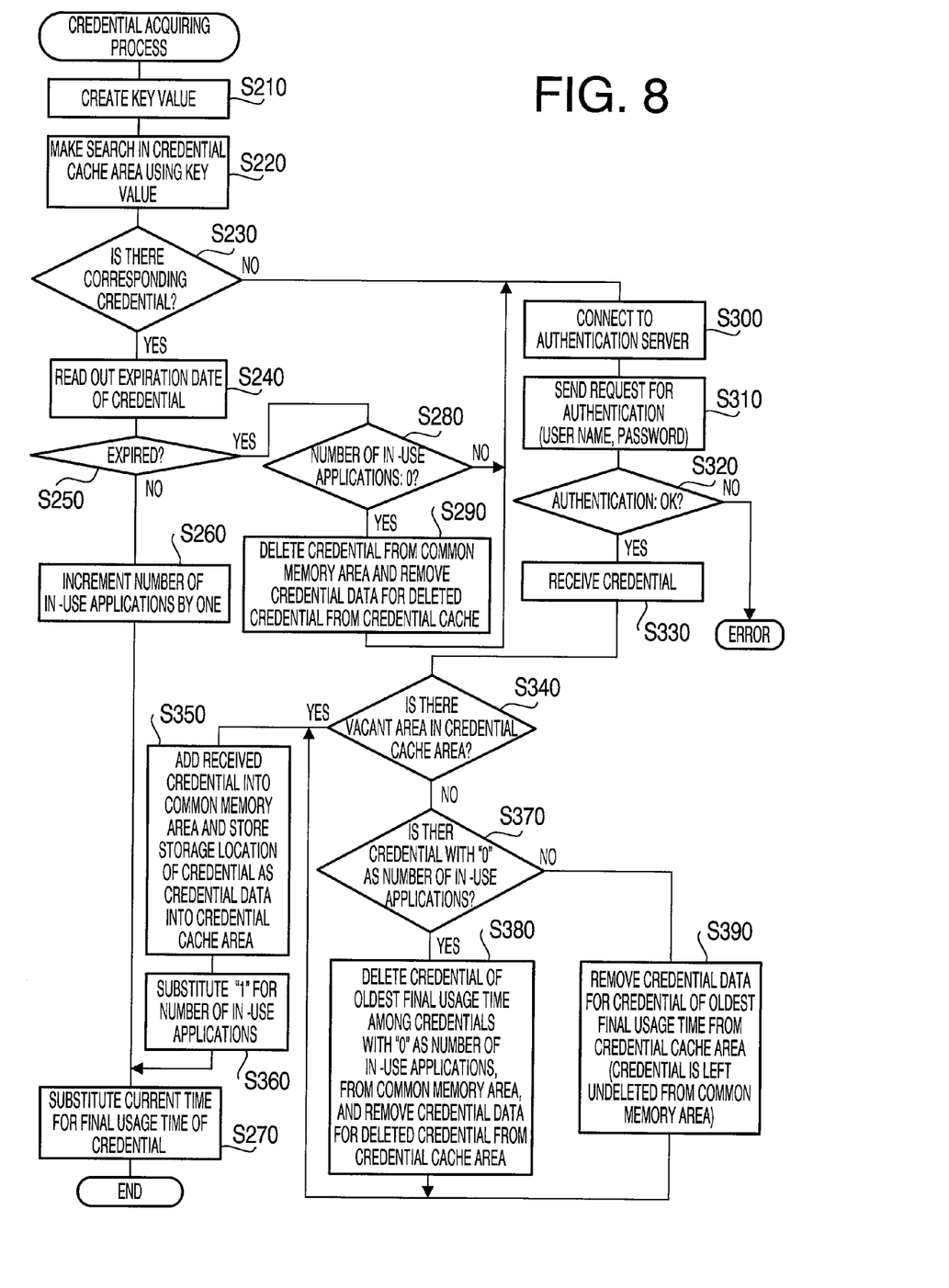
FIG. 8 is a flowchart showing a credential acquiring process in the modification according to one or more aspects of the present invention.

In order to attain the above configuration (operation), the credential acquiring process shown in FIG. 5 may partially be modified as illustrated in FIG. 8. Specifically, in S350, the controller 20 stores the credential acquired from the authentication server 8 in the common memory area, and stores the storage location as credential data in the credential cache area. In deleting the credential in S290 or S380, credential data for the credential to be deleted is removed from the credential cache area, and the credential, corresponding to the credential data removed, is deleted from the common memory area.

Further, when it is determined in S370 that there is no credential data for a credential with "0" as the number of in-use applications in the credential cache area (S370: No), credential data for a credential of the oldest final usage time is removed from the credential cache area in S390 while the credential is left undeleted from the common memory area.

Such a credential acquiring process can provide the same effects as the aforementioned embodiment.

In the aforementioned embodiment, aspects of the present invention are applied to the MFP 10 having various functions such as a printer function and a scanner function. However, aspects of the present invention may be applied to a network device configured to be used by a plurality of users, and it can provide the same effects as the aforementioned embodiment.

In the aforementioned embodiment, the authentication server 8 and the application servers 6 as service providing servers are configured to authenticate a user in the Kerberos authentication. However, aspects of the present invention may be applied to a system that authenticates a user in an authentication method different from the Kerberos authentication.

Thus, when aspects of the present invention are applied to a network system that is configured such that the authentication server 8 issues a certificate in response to a request from a network device such as the user terminal devices 4 and the MFP 10, and a service providing server such as the application servers 6 authenticates a user of the network device based on the certificate, the same effects as the aforementioned embodiment can be provided.

What is claimed is:

1. A network device, comprising:
   a communication unit configured to connect with a service providing server, an authentication server, and a terminal device via a network;
   an acquisition information storage configured to store a plurality of pieces of acquisition information each for acquiring a certificate corresponding to a specific one of a plurality of services provided by the service providing server, wherein the plurality of pieces of acquisition information includes:
      a first piece of acquisition information that establishes a first relationship between a first one of the services, a first one of a plurality of authentication servers including the authentication server, and a first user, among a plurality of users, who directly operates the network device; and
      a second piece of acquisition information that establishes a second relationship between a second one of the services, a second one of the plurality of authentication servers, and a second user, among the plurality of users, who accesses the network device via the terminal device;
   a certificate storage configured to store certificates, acquired from the authentication server, in association with the services, respectively;
   at least one processor; and
   memory storing computer-executable instructions that, when executed by the at least one processor, cause the network device to:
      accept, from a requestor among the plurality of users, a request for usage of one of the plurality of services provided by the service providing server;
      in response to acceptance of the request, determine whether a certificate necessary for utilizing the requested service is stored in the certificate storage by searching for the necessary certificate within the certificate storage based on a specific one of the pieces of acquisition information for acquiring the necessary certificate that is stored in the acquisition information storage in association with the requestor and the requested service;
      when determining that the necessary certificate is not stored in the certificate storage, read out the specific one of the pieces of acquisition information for acquiring the necessary certificate that is stored in association with the requestor and the requested service from the acquisition information storage, identify a specific one of the plurality of authentication servers associated with the requestor and the requested service, acquire the necessary certificate from the identified authentication server based on the specific piece of acquisition information read out, and store the acquired necessary certificate into the certificate storage;
      when determining that the necessary certificate is stored in the certificate storage, acquire the necessary certificate associated with the requested service from the certificate storage;
      send the necessary certificate to the service providing server;
      receive a permission to utilize the requested service from the service providing server; and
      utilize the requested service in response to receipt of the permission.

2. The network device according to claim 1,
   wherein the acquisition information storage is configured such that services that have respective different usage conditions are registered therein as different services, and that each piece of the acquisition information stored therein is information for acquiring a certificate necessary for utilizing one of the plurality of services under a predetermined usage condition,
   wherein the computer-executable instructions, when executed, further cause the network device to accept a usage condition for the requested service, and
   wherein the computer-executable instructions, when executed, further cause the network device to, in response to acceptance of the request and the usage condition, determine whether the certificate necessary for utilizing the requested service under the accepted usage condition is stored in the certificate storage.

3. The network device according to claim 1,
   wherein the certificate storage is configured such that each certificate is registered therein with an expiration date of the certificate attached thereto,
   wherein the computer-executable instructions, when executed, further cause the network device to:
      when the necessary certificate is stored in the certificate storage, determine whether the necessary certificate is expired, based on the expiration date attached thereto; and
      when determining that the necessary certificate is expired, delete the expired certificate from the certificate storage and determine that the necessary certificate is not stored in the certificate storage.

4. The network device according to claim 1,
   wherein the certificate storage is configured such that a total number of certificates storable therein is less than a total number of the pieces of acquisition information stored in the acquisition information storage, and
   wherein the computer-executable instructions, when executed, further cause the network device to:
      when a certificate is acquired from the authentication server, determine whether the acquired certificate can be additionally registered in the certificate storage;
      when determining that the acquired certificate cannot be additionally registered in the certificate storage, determine whether there is a certificate corresponding to a disused service, of which usage has been finished, in the certificate storage; and when determining that there is a certificate corresponding to the disused service in the certificate storage, delete the certificate corresponding to the disused service from the certificate storage.

5. The network device according to claim 4, further comprising:
a second certificate storage,
wherein the computer-executable instructions, when executed, further cause the network device to:
attach a final usage time of each certificate stored in the certificate storage to the certificate;
when determining that there is no certificate corresponding to the disused service in the certificate storage, save, into the second certificate storage, a copy of a certificate having an oldest final usage time among the certificates stored in the certificate storage;
identify a storage location of the copy of the certificate in the second certificate storage, and continue to utilize one of the services corresponding to the certificate having the oldest final usage time using the copy of the certificate; and
delete the certificate having the oldest final usage time from the certificate storage.

6. The network device according to claim 4, further comprising:
a second certificate storage configured to store therein certificates acquired from the authentication server,
wherein the certificate storage is configured to store therein management data for the certificates stored in the second certificate storage, and the management data comprises storage locations of the certificates in the second certificate storage,
wherein the computer-executable instructions, when executed, further cause the network device to:
attach a final usage time of each certificate stored in the certificate storage to the corresponding certificate;
when a certificate is acquired from the authentication server, determine whether the management data for the acquired certificate can be additionally registered in the certificate storage;
when determining that the management data for the acquired certificate cannot be additionally registered in the certificate storage, determine whether there is management data for a certificate corresponding to the disused service in the certificate storage;
when determining that there is management data for a certificate corresponding to the disused service in the certificate storage, delete the certificate corresponding to the disused service and the management data therefor from the second certificate storage and the certificate storage, respectively; and
when determining that there is no management data for a certificate corresponding to the disused service in the certificate storage, delete, from the certificate storage, management data for a certificate having an oldest final usage time among the management data stored in the certificate storage.

7. The network device according to claim 4,
wherein a same piece of the plurality of pieces of acquisition information is settable for multiple services among the plurality of services, and
wherein the certificate storage is configured such that each certificate is registered therein in association with a total number of in-use services for the corresponding certificate.

8. The network device according to claim 7,
wherein each piece of the plurality of pieces of acquisition information stored in the acquisition information storage includes a user name, a password, and an authentication server name,
wherein the certificate storage is configured such that each certificate is registered therein with identification data attached to the certificate, the identification data being created based on the user name, the password, and the authentication server name included in the corresponding piece of acquisition information,
wherein the computer-executable instructions, when executed, further cause the network device to:
in response to acceptance of the request, create the identification data based on the user name, the password, and the authentication server name included in the corresponding piece of acquisition information for the certificate necessary for utilizing the requested service; and
determine whether the certificate necessary for utilizing the requested service is stored in the certificate storage, based on the identification data created.

9. The network device according to claim 1,
wherein the plurality of pieces of acquisition information stored in the acquisition information storage each includes a user name and a password in association with each of the plurality of services,
wherein the computer-executable instructions, when executed, further cause the network device to:
in response to acceptance of the request, create identification data based on the user name and the password that are included in the corresponding piece of acquisition information stored in the acquisition information storage in association with the requested service, search for the necessary certificate within the certificate storage based on the created identification data, and determine whether the certificate necessary for utilizing the requested service is stored in the certificate storage; and
when the necessary certificate is acquired, store the acquired certificate into the certificate storage in association with the identification data created based on the user name and the password that are included in the acquisition information stored in the acquisition information storage in association with the requested service.

10. A non-transitory computer readable storage medium having computer readable instructions stored thereon that, when executed by a processor of a network device connectable with a service providing server and an authentication sever, an authentication server, and a terminal device via a network, cause the network device to perform:
a request accepting step of accepting, from a requestor among a plurality of users, a request for usage of one of a plurality of services provided by the service providing server;
a certificate acquiring step of acquiring a certificate necessary for utilizing the requested service from one of the authentication server and the network device;
a certificate sending step of sending the necessary certificate to the service providing server;
a permission receiving step of receiving a permission to utilize the requested service from the service providing server; and
a service utilizing step of utilizing the requested service in response to receipt of the permission, wherein the certificate acquiring step comprises a determining step of, in response to acceptance of the request, determining whether the certificate necessary for utilizing the requested service is stored in a certificate storage of the network device by searching for the necessary certificate within the certificate storage based on a specific one of a plurality of pieces of acquisition information for acquiring the necessary certificate that is stored in an acquisition information storage in association with the requestor and the requested service, wherein each of the plurality of pieces of acquisition information is usable for acquiring a certificate corresponding to a specific one of the plurality of services provided by the service providing server, and wherein the plurality of pieces of acquisition information includes:
- a first piece of acquisition information that establishes a first relationship between a first one of the services, a first one of a plurality of authentication servers including the authentication server, and a first user, among the plurality of users, who directly operates the network device; and
- a second piece of acquisition information that establishes a second relationship between a second one of the services, a second one of the plurality of authentication servers, and a second user, among the plurality of users, who accesses the network device via the terminal device;

wherein the certificate acquiring step comprises, when it is determined in the determining step that the certificate necessary for utilizing the requested service is not stored in the certificate storage, reading out the specific one of the pieces of acquisition information for acquiring the necessary certificate that is stored in association with the requestor and the requested service from the acquisition information storage of the network device, identifying a specific one of the plurality of authentication servers associated with the requestor and the requested service, acquiring the necessary certificate from the identified authentication server based on the specific piece of acquisition information read out, and storing the acquired necessary certificate into the certificate storage, and wherein the certificate acquiring step further comprises, when it is determined in the determining step that the certificate necessary for utilizing the requested service is stored in the certificate storage, acquiring the necessary certificate associated with the requested service from the certificate storage.

11. The non-transitory computer readable storage medium according to claim 10,
wherein the acquisition information storage is configured such that services that have respective different usage conditions are registered therein as different services, and that each piece of the acquisition information stored therein is information for acquiring a certificate necessary for utilizing one of the plurality of services under a predetermined usage condition,
wherein the request accepting step further comprises accepting a usage condition for the requested service, and
wherein the determining step further comprises, in response to acceptance of the request and the usage condition, determining whether the certificate necessary for utilizing the requested service under the accepted usage condition is stored in the certificate storage.

12. The non-transitory computer readable storage medium according to claim 10,
wherein the certificate storage is configured such that each certificate is registered therein with an expiration date of the certificate attached thereto, and
wherein the determining step comprises:
- an expiration determining step of, when the necessary certificate is stored in the certificate storage, determining whether the necessary certificate is expired, based on the expiration date attached thereto; and
- an expired certificate deleting step of, when it is determined in the expiration determining step that the necessary certificate is expired, deleting the expired certificate from the certificate storage and determining that the necessary certificate is not stored in the certificate storage.

13. The non-transitory computer readable storage medium according to claim 10,
wherein the certificate storage is configured such that a total number of certificates storable therein is less than a total number of the pieces of acquisition information stored in the acquisition information storage, and
wherein the certificate acquiring step further comprises:
- a registration determining step of, when a certificate is acquired from the authentication server, determining whether the acquired certificate can be additionally registered in the certificate storage;
- a disused service determining step of, when it is determined in the registration determining step that the acquired certificate cannot be additionally registered in the certificate storage, determining whether there is a certificate corresponding to a disused service, of which usage has been finished, in the certificate storage; and
- a deleting step of, when it is determined in the disused service determining step that there is a certificate corresponding to the disused service in the certificate storage, deleting the certificate corresponding to the disused service from the certificate storage.

14. The non-transitory computer readable storage medium according to claim 13,
wherein the network device further comprises a second certificate storage,
wherein the certificate acquiring step further comprises:
- a usage time attaching step of attaching a final usage time of each certificate stored in the certificate storage to the certificate;
- a copy step of, when it is determined in the disused service determining step that there is no certificate corresponding to the disused service in the certificate storage, saving, into the second certificate storage, a copy of a certificate having an oldest final usage time among the certificates stored in the certificate storage; and
- an informing step of informing the network device in the service utilizing step about a storage location of the copy of the certificate in the second certificate storage, such that in the service utilizing step, the network device continues to utilize one of the services corresponding to the certificate having the oldest final usage time using the copy of the certificate, and
wherein the deleting step comprises deleting the certificate having the oldest final usage time from the certificate storage.

15. The non-transitory computer readable storage medium according to claim 13,
wherein the network device further comprises a second certificate storage configured to store therein certificates acquired from the authentication server, wherein the certificate acquiring step further comprises a usage time attaching step of attaching a final usage time of each certificate stored in the certificate storage to the corresponding certificate, wherein the certificate storage is configured to store therein management data for the certificates stored in the second certificate storage, and the management data comprises storage locations of the certificates in the second certificate storage, wherein the registration determining step comprises, when a certificate is acquired from the authentication server, determining whether the management data for the acquired certificate can be additionally registered in the certificate storage, wherein the disused service determining step comprises, when it is determined in the registration determining step that the management data for the acquired certificate cannot be additionally registered in the certificate storage, determining whether there is management data for a certificate corresponding to the disused service in the certificate storage, wherein the deleting step comprises, when it is determined in the disused service determining step that there is management data for a certificate corresponding to the disused service in the certificate storage, deleting the certificate corresponding to the disused service and the management data therefor from the second certificate storage and the certificate storage, respectively, and wherein the deleting step further comprises, when it is determined in the disused service determining step that there is no management data for a certificate corresponding to the disused service in the certificate storage, deleting, from the certificate storage, management data for a certificate having an oldest final usage time among the management data stored in the certificate storage.

16. The non-transitory computer readable storage medium according to claim 13, wherein a same piece of the plurality of pieces of acquisition information is settable for multiple services among the plurality of services, and wherein the certificate storage is configured such that each certificate is registered therein with a total number of in-use services attached to the certificate.

17. The non-transitory computer readable storage medium according to claim 16, wherein each piece of the plurality of pieces of acquisition information stored in the acquisition information storage includes a user name, a password, and an authentication server name, wherein the certificate storage is configured such that each certificate is registered therein with identification data attached to the certificate, the identification data being created based on the user name, the password, and the authentication server name included in the corresponding piece of acquisition information, wherein the determining step further comprises an identification data creating step of, in response to acceptance of the request, creating the identification data based on the user name, the password, and the authentication server name included in the corresponding piece of acquisition information for the certificate necessary for utilizing the requested service, and wherein the determining step comprises determining whether the certificate necessary for utilizing the requested service is stored in the certificate storage, based on the identification data created.

\* \* \* \* \*